(12) United States Patent
Okazaki et al.

(10) Patent No.: US 7,258,356 B2
(45) Date of Patent: Aug. 21, 2007

(54) VEHICLE STEERING DAMPER APPARATUS, AND VEHICLE INCORPORATING SAME

(75) Inventors: Yasunori Okazaki, Saitama (JP); Kaori Inada, Saitama (JP); Shinichi Ozeki, Saitama (JP); Katsuyuki Konishi, Saitama (JP); Masayuki Dazai, Saitama (JP); Taisuke Nimura, Saitama (JP); Masayuki Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 10/915,120

(22) Filed: Aug. 10, 2004

(65) Prior Publication Data

US 2005/0087969 A1    Apr. 28, 2005

(30) Foreign Application Priority Data

Sep. 9, 2003 (JP) .............................. 2003-317244
Sep. 9, 2003 (JP) .............................. 2003-317575

(51) Int. Cl.
*B60K 28/16* (2006.01)
*F16F 9/14* (2006.01)

(52) U.S. Cl. .................................... 280/272; 188/290

(58) Field of Classification Search ................ 280/272, 280/279, 280, 271, 89, 89.12, 89.13; 188/290
See application file for complete search history.

(56) References Cited

U.S. PATENT DOCUMENTS 582,279 A * 5/1897 Gold .......................... 280/272
2,087,535 A * 7/1937 Dall ........................... 280/272
3,990,716 A * 11/1976 Dows .......................... 280/271
6,257,795 B1 * 7/2001 Stroh .......................... 403/131
6,834,734 B2 * 12/2004 Wu ............................. 180/65.5
6,860,638 B2 * 3/2005 Fish ............................ 384/300

FOREIGN PATENT DOCUMENTS

| EP | 1 247 729 | 10/2002 |
|----|-----------|---------|
| EP | 1 298 049 | 4/2003 |
| EP | 1 459 971 | 9/2004 |
| JP | 2003081172 A | 3/2003 |
| JP | 2003104269 A | 4/2003 |

* cited by examiner

*Primary Examiner*—Tony Winner
(74) *Attorney, Agent, or Firm*—Carrier, Blackman & Associates, P.C.; William D. Blackman; Joseph P. Carrier

(57) ABSTRACT

A steering damper apparatus for a two-wheeled vehicle includes a steering damper housing with a lower end portion fixed to the motorcycle's main frame. A first torque arm has a first end fixed to a pivotally movable shaft, and a second end which is connected, via a first pin, to a first end of a second torque arm. The second torque arm has a second end bolted to a top bridge on the main frame. The first and second torque arms are pivotally movable relative to one another, via the pivot shaft and the first pin. The apparatus is capable of accommodating a change in distance between the pivot shaft and the bolt on the second torque arm. A two-part cover is provided for the steering damper body, including a housing cover secured to a fixed side thereof, and a torque arm cover secured to a movable side thereof.

18 Claims, 15 Drawing Sheets

Front

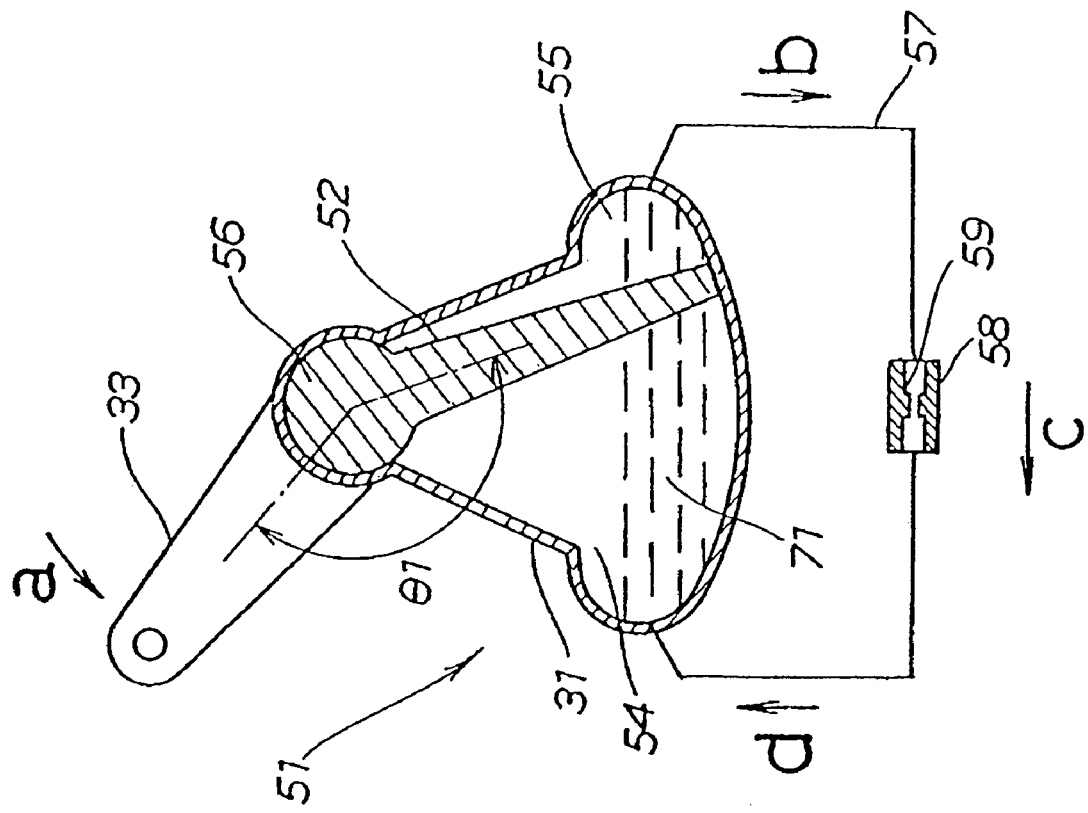
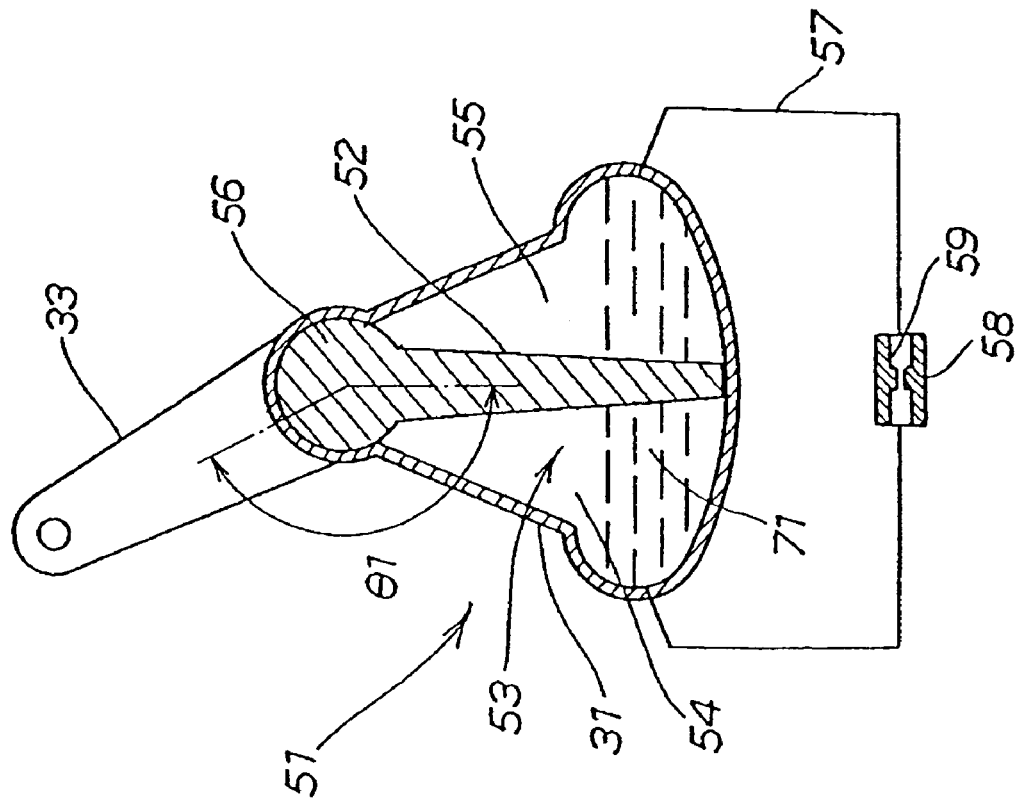
Fig. 6(a)
Fig. 6(b)

PRIOR ART

VEHICLE STEERING DAMPER APPARATUS, AND VEHICLE INCORPORATING SAME

CROSS-REFERENCE TO RELATED APPLICATIONS

The present invention claims priority under 35 USC 119 based on Japanese patent application No. 2003-317244, filed Sep. 9, 2003, and Japanese patent application No. 2003-317575, filed Sep. 9, 2003.

BACKGROUND OF THE INVENTION

1. Field of the Invention

The present invention relates to vehicle hydraulic steering damper apparatus suitable for use in a steering system of a two-wheeled vehicle, and to a vehicle incorporating the described apparatus.

2. Description of the Background Art

Conventionally, a number of steering damper designs are known for use on two-wheeled vehicles. For example, a steering damper arranged above a head pipe provided at a front end of a vehicle body frame has previously been disclosed (See, for example, Japanese Patent Laid-Open No. 2003-81172).

FIG. 9 of the drawings in the present invention disclosure is a reproduction of FIG. 2 of Japanese Patent Laid-Open No. 2003-81172, included herein for discussion purposes. However, the reference numerals in FIG. 9 hereof have been changed from the original numbers used in the reference.

In the prior art structure depicted in FIG. 9, a steering damper 200 is a hydraulic attenuator arranged between a top bridge 201, which is part of a pivotally movable steering structure, and a substantially rigid head portion 203 attached to and located forward of the vehicle body frame 202.

The steering damper 200 of FIG. 9 has a body portion 204 and a lid 205, which cooperate to define a casing. At this time, the body portion 204 and the lid 205 are jointly fastened together.

A rear portion of the steering damper 200 is connected to a boss 207, which protrudes upwardly on the upper surface of the head portion 203 of the vehicle body frame 202. The steering damper 200 is attached to the boss 207 by a bolt 206.

A steering nut 208 fastens the upper end of a steering shaft 211, located inside a head pipe 209, to the top bridge 201. Also, the steering nut 208 surrounds the lower end of a pivot shaft 212, which is a rotatable shaft of the steering damper 200, and which is fixedly connected to the steering shaft 211. The pivot shaft 212 is also connected to the top bridge 201 via the steering nut 208.

In other words, the pivot shaft 212 and the steering shaft 211 are connected to one another, and rotate integrally together via the top bridge 201.

In this respect, reference numeral 213 designates a bottom bridge; 214, a fuel tank; and 215, a turning angle sensor.

When the vehicle receives an external force from a road surface while it is traveling, the steering damper 200 detects a turning angle of the steering shaft 211 with the turning angle sensor 215, which rotates integrally with the pivot shaft 212. The damper 200 is operable to absorb the external force from the road surface by outputting a signal to a control apparatus.

In the structure of the steering damper 200 of the Japanese Patent Laid-Open No. 2003-81172, however, although the pivot shaft 212 is directly fitted in the steering shaft 211, there is a problem that in order to accurately determine the relative positions of the pivot shaft 212 and the steering shaft 211, it is necessary to use enhanced precision parts, and thus it is difficult and expensive to manufacture.

Also, the pivot shaft 212 and the top bridge 201 can be connected together through the use of an adjustment mechanism, such as a coupling arm and a spherical bearing incorporating an eccentric collar. However, there is a problem in that the structure of the spherical bearing incorporating the eccentric collar is complicated, resulting in increased maintenance expenses.

A steering damper apparatus to be installed to a vehicle such as a motorcycle has been proposed in which, during pivotal motion of a movable partition wall for partitioning an oil chamber within a housing into two parts, a damping force is generated by circulating hydraulic fluid between these two oil chambers. The apparatus comprises a shaft for pivotally supporting the movable partition wall with respect to the housing, while coupling the base of the movable partition wall in a fixed state. The housing and shaft are arranged above the head pipe. The rear portion of the housing is housed within a concave portion formed at the front end portion of the fuel tank. See, for example, Japanese Patent Laid-Open No. 2003-104269, with special reference to page 2 and FIG. 2 thereof.

In the steering damper apparatus specified in Japanese Patent Laid-Open No. 2003-104269, the steering damper includes the housing, the shaft and the like, and a connected portion between this steering damper and the steering system members are exposed to weathering and to the elements on the outside thereof.

An additional concern is related to the placement of the damper on the vehicle. The steering damper apparatus is arranged to be centered in the front part of the vehicle body above the head pipe. This is one of the most conspicuous places on the vehicle, and the outside appearance of this portion can be considered to be made unattractive by placement of the steering damper in this location.

SUMMARY OF THE INVENTION

The present invention provides a steering damper, for a saddle-type vehicle, which solves some of the above-mentioned problems. In one embodiment of the present invention, a steering damper apparatus is capable of adjusting to a change in distance between a pivotally movable steering shaft and the vehicle body side even if the shaft and connected parts are not formed having enhanced precision. An advantage of the present invention, in an embodiment having a pivot arm cover and a housing cover, is that it provides a steering damper apparatus having an attractive outside appearance.

According to a first aspect of the invention, a vehicle is provided in which a pivotally movable steering system member, that allows steering of the vehicle, is operatively connected to a fixed frame member on the vehicle body side. A steering damper apparatus, including a rotary damper having a pivotally movable shaft, is interposed between the vehicle body side and the steering system member.

The steering damper apparatus according to the first aspect also includes a first torque arm having an inner end which is fixed to the pivot shaft of this rotary damper. The first torque arm also has an outer end opposite the inner end, and the steering damper apparatus also includes a second torque arm connected to the outer end of the first torque arm, in such a manner as to be pivotally movable.

The tip of the second torque arm is installed to one of the vehicle body side and the steering system member, and a damper case of the rotary damper is installed to the other of the vehicle body side and the steering system member.

The pivot shaft of the rotary damper is interconnected to the vehicle body side or the steering system member via a linking structure including the first torque arm, a connecting pin, and the second torque arm. The first torque arm and the second torque arm are made into a V-shaped link, and an angle between those two torque arms is able to be changed in response to road obstacles, whereby a change in distance between the vehicle body side and the steering system member is absorbed.

In the steering damper according to the first aspect of the invention, in order to absorb the change in distance between the vehicle body side and the steering system member, the angle between a pair of torque arms is changed. Since only the number of torque arms is increased, structure of the steering system does not become complicated, and it is possible to minimize any cost increase.

In addition, since the angle between the pair of torque arms automatically varies in accordance with the change in distance, no special maintenance is required.

In order to solve the problem related to the appearance of the steering damper apparatus, according a second aspect of the invention, there is provided an improved steering damper apparatus. The improved steering damper apparatus, in which during rocking of a movable partition wall for partitioning an oil chamber into two parts within a housing, a damping force is generated by circulating hydraulic fluid between these two oil chambers. The steering damper apparatus includes a shaft for rockingly supporting the movable partition wall with respect to the housing while coupling the base of the movable partition wall in a fixed state, characterized in that one end of the shaft is caused to project outwardly from the housing. A torque arm is connected to the projected portion of the shaft. The housing is installed to one of the body frame-side member and the steering system-side member. A housing cover for covering the housing is installed to one of the body frame-side member and the steering system-side member or the housing. The torque arm is installed to the other of the body frame-side member and the steering system-side member. A torque arm cover for covering the torque arm is installed to the other of the body frame-side member and the steering system-side member or the arm.

A steering damper apparatus according to another aspect of the invention is, in addition to one specified above, characterized that in at least one of a mating surface between the housing cover and the torque arm cover, there is formed a circular arc surface having the same center as a pivot axis of the steering system-side member.

A steering damper apparatus according to yet another aspect of the invention is, in addition to one specified above, characterized that the torque arm cover is fastened to the steering system-side member in the neighborhood of an installation area of the steering system-side member of the torque arm, and is restrained on the steering system-side member by a restraint at a portion to be covered by the housing cover.

According to the invention specified above, since the housing and the torque arm are covered with the housing cover and the torque arm cover respectively, the housing and the torque arm, which are members for constituting the steering damper, are not directly exposed to the elements and inclement weather on the outside, and as a result, the outside appearance is attractive, and remains so over time.

Also, since the cover is divided into portions which are installed on members on the body frame side, which is a fixed side, and portions which are installed on members of the steering system-side, which is a movable side, the steering damper, having movable elements, can be covered with a comparatively small cover.

According to the invention specified above, when the steering system-side member rocks with respect to the body frame-side member, the housing cover and the torque arm cover move relatively following it. At this time, since at least one of mating surfaces between those both covers is made into a circular arc surface having the same center as a pivot axis, an aspect of laying one cover upon another does not change. As a result, a clearance between both covers can be maintained constant irrespective of the rocking position of the steering system-side member, and for this reason, the clearance between both covers can be designed to be small.

According to the invention specified above, since the torque arm cover is installed to the steering system-side member by both fasteners and restraints, a secure connection can be realized. Also, in portions to be covered with the housing cover, restraint is performed by suitable restraining structure. Since this is a simple and easy method of connecting these components, installation of the torque arm cover becomes easier, and the outside appearance is also improved.

Modes for carrying out the present invention are explained below by reference to a number of selected illustrative embodiments of the present invention. The above-mentioned object, other objects, characteristics and advantages of the present invention will become apparent from a review of the following detailed description, which should be read in conjunction with the accompanying drawings. Throughout the following detailed description and in the drawings, like numbers refer to like parts.

BRIEF DESCRIPTION OF THE DRAWINGS

FIG. 6(a) is a first sequential working view showing the principle of the rotary damper portion of the steering damper apparatus according to an embodiment of the present invention, and FIG. 6(b) is a second sequential view thereof;

FIG. 18b is a cross-sectional detail view taken on line X-X of FIG. 18a.

DETAILED DESCRIPTION OF THE INVENTION

Hereinafter, a number of selected illustrative embodiments for carrying out the present invention will be described, with reference to the accompanying drawings. Specifically, a motorcycle equipped with a steering damper apparatus according to an illustrative embodiment of the present invention will be described. In this respect, relative positional terms such as in front, behind, and left and right, as used in the description, are given from the vantage point of a driver, seated on the motorcycle and facing forward thereon.

Figure 1:
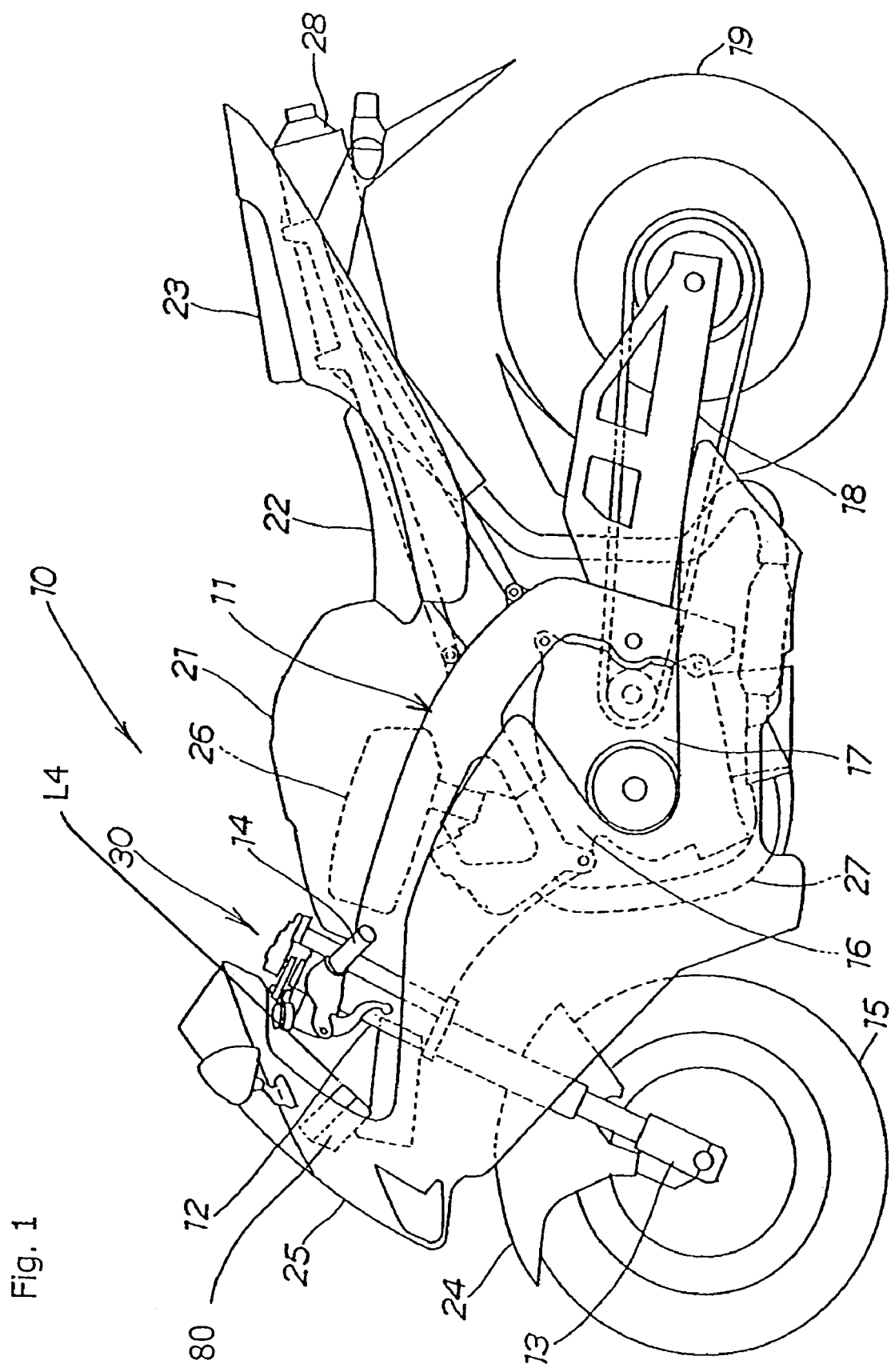
FIG. 1 is a side elevational view of a two-wheeled vehicle equipped with a steering damper apparatus according to a selected illustrative embodiment of the present invention.

FIG. 1 is a side elevational view showing a saddle-type vehicle, which by way of example is a motorcycle 10, equipped with a steering damper apparatus 30 according to a selected illustrative embodiment of the present invention. The steering damper apparatus hereof can generally be adapted to be used on any saddle-type vehicle which is pivotally steerable using handlebars.

The motorcycle 10 includes a main frame 11; a front fork 13 and handlebars 14 which are operatively connected to a steering shaft 42 (to be described in detail later), which is pivotally supported by a head pipe 12 provided at the front end of the main frame 11. The motorcycle 10 also includes a front wheel 15, rotatably mounted to the lower end portion of the front fork 13, an engine 16 installed in the lower part of the main frame 11, and a transmission 17 integrally provided in the rear of the engine 16.

The motorcycle 10 also includes a swing arm 18, pivotally connected to the rear of the main frame 11, for accommodating reciprocal up and down movement of a rear wheel 19, which is rotatably installed on the rear end portion thereof. The motorcycle 10 further includes a fuel tank 21, installed on the upper part of the main frame 11.

Still further, the motorcycle includes a driver's seat 22, installed behind the fuel tank 21, and a pillion seat 23, installed behind the driver's seat 22 for accommodating a passenger. Here, reference numeral 24 designates a front fender for covering the front wheel 15; reference numeral 25 designates an upper cowl; and reference numeral 26 designates an intake air box. Reference numeral 27 designates an exhaust pipe extending backward from the engine 16; and reference numeral 28 designates a muffler connected to the exhaust pipe 27.

Figure 2:
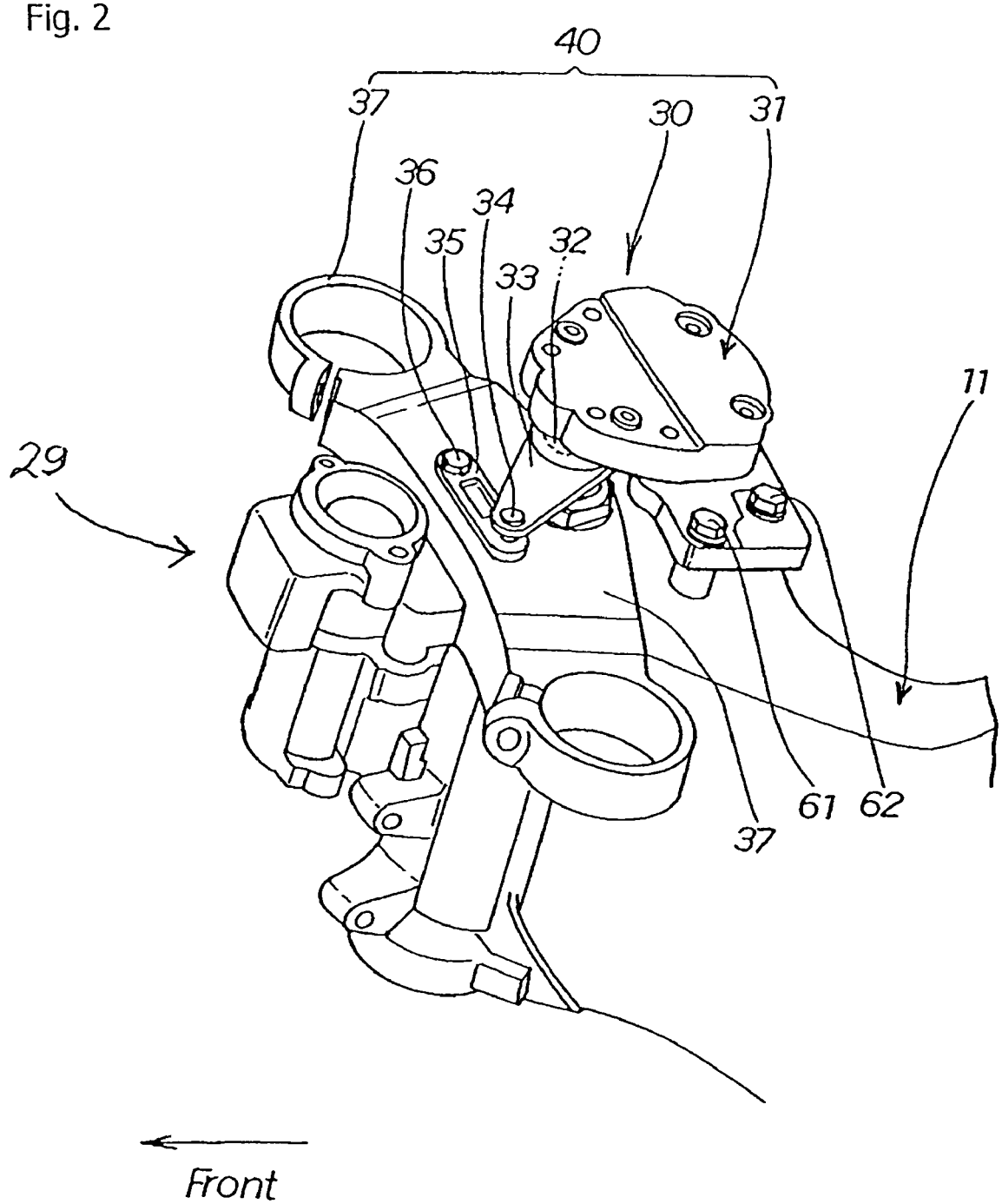
FIG. 2 is a perspective view showing an upper central portion of the steering system of the two-wheeled vehicle of FIG. 1.
Figure 3:
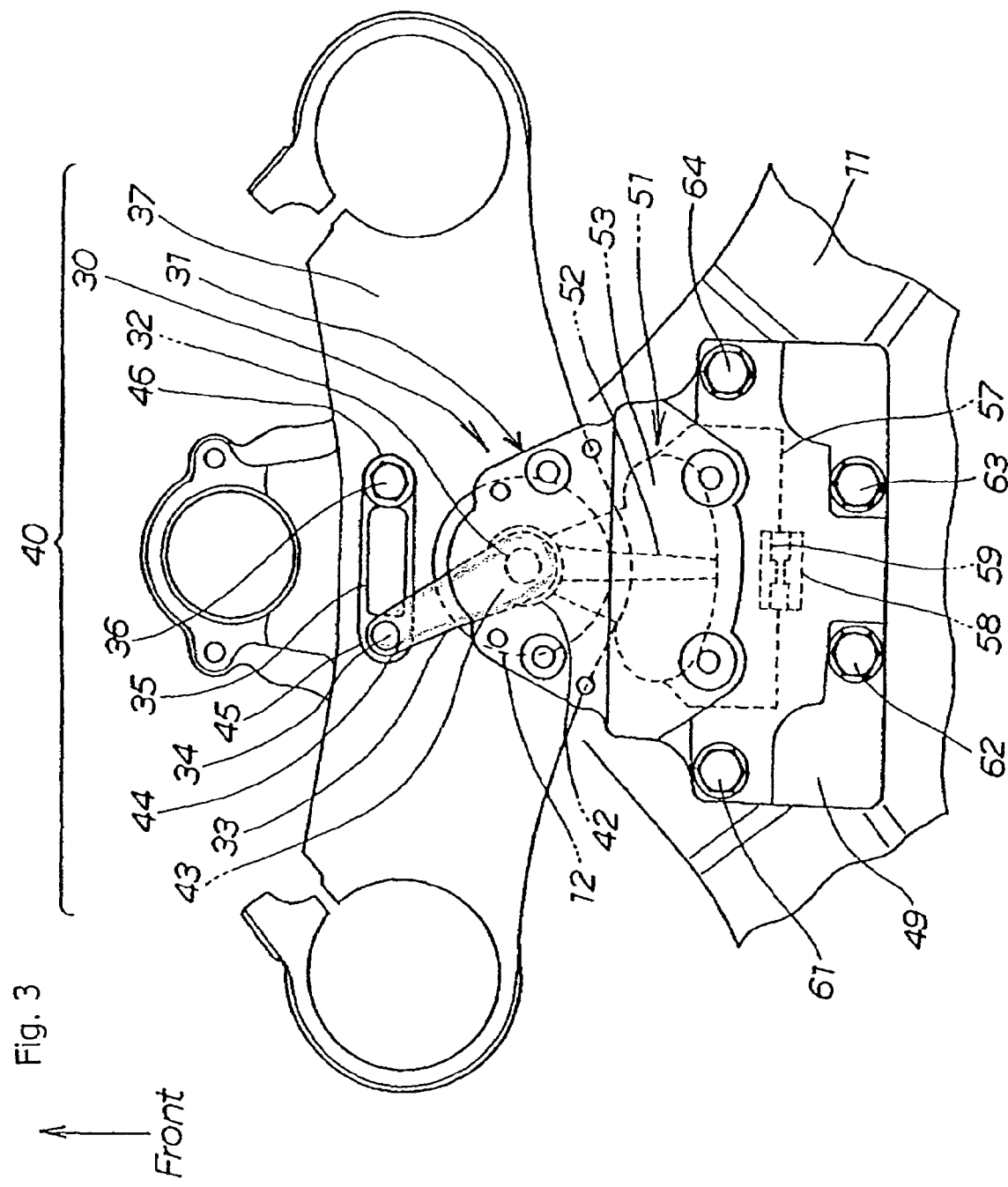
FIG. 3 is a top plan view showing the upper central portion of the steering system including a steering damper apparatus according to a first embodiment of the invention.
Figure 4:
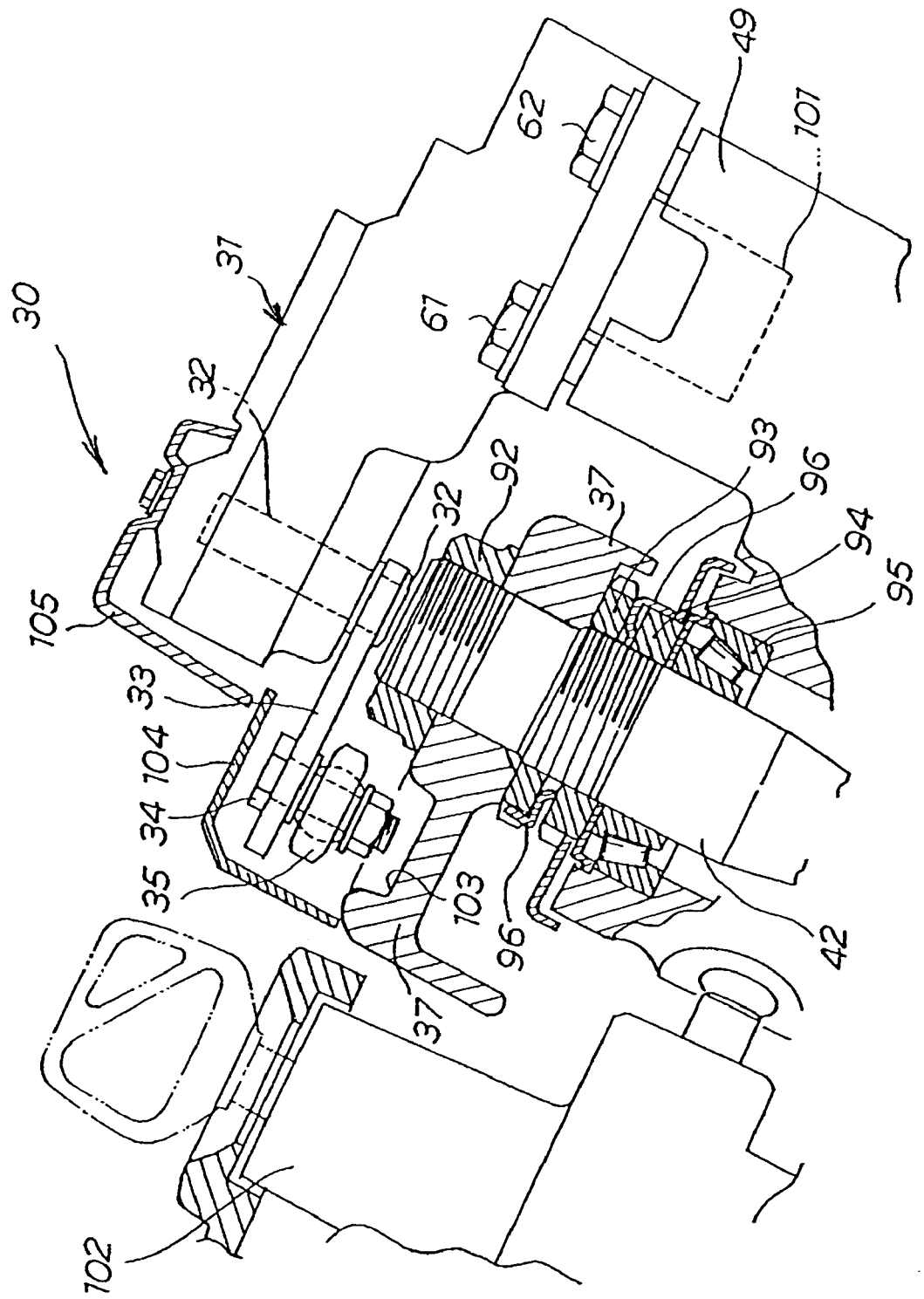
FIG. 4 is a side detail view in partial section showing the steering damper apparatus of FIG. 3.

Referring also to FIGS. 2-4 as well as FIG. 1, the steering system 40 for steering the front wheel 15 includes a pivotally movable portion 29 including a top bridge 37, arranged above and parallel to a bottom bridge, and the handlebars 14, which are respectively affixed to the top bridge.

The steering system 40 also includes the steering damper apparatus 30 interposed between the pivotally movable portion 29 of the steering system 40 and the body frame 11 (see FIG. 2, FIG. 3), for damping movement of the pivotally movable portion 29. The steering damper apparatus 30 is arranged above the head pipe 12 and the handlebars 14, and also absorbs an external force exerted from the road surface during traveling, as needed.

With continued reference to FIGS. 2 and 3, wherein an arrow indicates the front of the motorcycle 10, a central front-end portion of a two-wheeled vehicle, according to an illustrative embodiment of the present invention, is shown. The steering damper apparatus 30 is constructed such that the lower rear portion of a steering damper housing 31 is fixed to the main frame 11 with bolts 61, 62 (include bolts 63, 64 although not shown).

The steering damper apparatus 30 includes a first torque arm 33 having an inner (first) end 43 which is fixed to a pivot shaft 32. The outer, forward end 44 of the first torque arm 33 is pivotally connected to a first end 45 of a second torque arm 35 via a first pin 34. (The first pin 34 may comprise a nut and bolt, as shown in FIG. 4.) The tip, or second end 46, of this second torque arm 35 affixed, via a fixing bolt 36, to the top bridge 37 of the steering system 40.

The first torque arm 33 and the second torque arm 35 are movable via the pivot shaft 32 and the first pin 34. These parts are collectively part of the steering system 40 of the motorcycle 10, and cooperate to form a linkage structure extending between the frame 11 and a pivotally movable part 29 of the steering system 40.

In this respect, the steering shaft 42 (FIG. 4) and the pivot shaft 32 of the steering damper apparatus 30, located above the steering shaft, are substantially coaxially located, but are not directly connected to one another.

Referring now to FIGS. 3 and 6, a rotary damper 51 includes a movable partition wall 52, which is reciprocally pivotally movable within an oil chamber 53, formed in a housing 31 of the steering damper 30. A communication passage 57 is formed internally within the steering damper 30, in fluid communication with the oil chamber 53. When the partition wall 52 is moved in the oil chamber 53, hydraulic oil from the oil chamber 53 is forced through the communication passage 57. A restriction orifice 59 is formed within an orifice formation member 58 in the communication passage 57, for controlling a flow rate of oil therethrough.

The rotary damper 51 is installed within the oil chamber 53 formed in the steering damper housing 31, as noted above. The steering damper housing 31 is characterized in that it is fixed to a steering damper stay 49, which is connected to the head pipe 12 with bolts 61, 62, 63, 64 and is installed on the vehicle body side, and is fixedly attached thereto.

FIG. 4 is a side view, partially in cross-section, showing the steering damper apparatus 30. The steering damper apparatus 30 provides a structural body in which a control valve driving solenoid 101 is installed in the lower end portion of the steering damper housing 31. The first torque arm 33 has an inner (first) end 43 (FIG. 3) disposed adjacent the lower end portion of the steering damper housing 31. This first end 43 of the first torque arm 33 is fixed to the lower end of the pivot shaft 32, as shown.

The outer, forwardly disposed second end 44 of this first torque arm 33 is connected to a first end 45 of the second torque arm 35, via the first pin 34. The second end 46 of this second torque arm 35 is affixed to the top bridge 37 via the fixing bolt 36 (FIG. 3).

In this case, the steering shaft 42 is located substantially coaxially with the pivot shaft 32 of the steering damper apparatus 30, which is located above the steering shaft 42. As seen in FIG. 4, the steering shaft 42 and the pivot shaft 32 are spaced a short distance apart, and are not brought into direct contact with one another.

Also, the steering shaft 42 is constructed to have nuts 92, 93 thereon, above and below a connected portion with the top bridge 37, and to have a nut 94 and a tapered roller bearing 95 on the lower portion thereof. A pawl-breaking washer 96 is interposed between the nut 93 and the nut 94 on the steering shaft 42.

In this respect, reference numeral 102 designates a main switch key cylinder; 103, a top bridge concave recess; 104, a top bridge-side cover; and 105, a body-side cover.

By providing the top bridge concave recess 103 below the first pin 34, the lower end of the first pin 34 becomes difficult to abut on the top bridge 37, and the steering damper 30 can be arranged at a low position.

A link mechanism including the pivot shaft 32; the first torque arm 33; the first pin 34; the second torque arm 35; and the fixing bolt 36 (FIG. 2) is arranged on the upper surface of the top bridge 37, substantially sandwiched between the steering shaft 42 and the main switch key cylinder 102.

Figure 5:
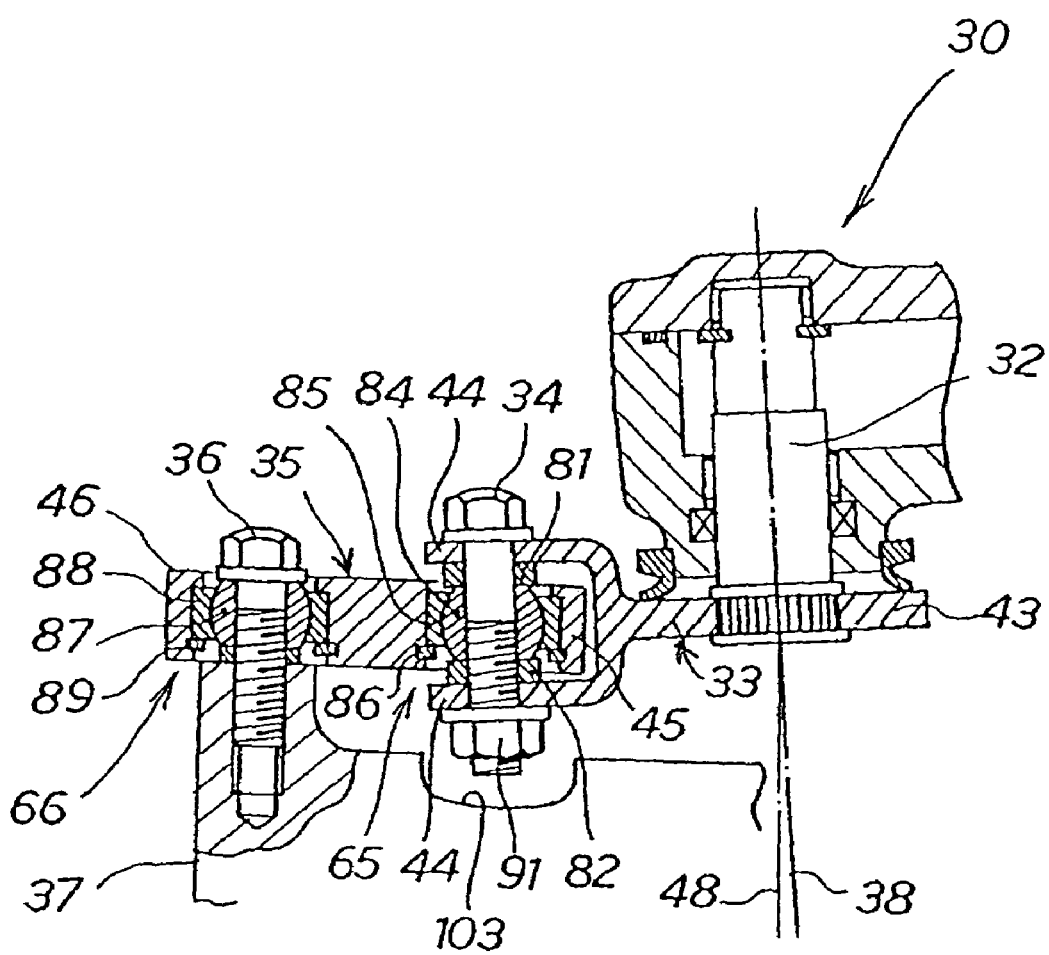
FIG. 5 is a cross-sectional detail view of part of the steering damper hereof, showing a connected portion between a pivot shaft, a first torque arm and a second torque arm.

FIG. 5 is a cross-sectional view showing the construction of an optional connected portion between the pivot shaft 32, the first torque arm 33 and the second torque arm 35. In the embodiment of FIG. 5, the first pin 34 interconnects the first and second torque arms 33, 35 by passing through a first spherical bearing 65 on the second torque arm 45 at a juncture extending between the second (forward or outer) end 44 of the first torque arm 33 and the first end 45 of the second torque arm 35.

Also, in the embodiment of FIG. 5, the fixing bolt 36 is inserted through a second spherical bearing 66 at the top bridge 37 via the second end 46 of the second torque arm 35.

Since each connected portion of this figure is merely illustrative, it is within the scope of the invention to allow for minor changes in connection portion structure, as long as the first pin 34, the fixing bolt 36, the first torque arm 33, and the second torque arm 35 are provided. Optionally, the first and second spherical bearings 65, 66 may also be included in this structure.

To explain in further detail, in the embodiment depicted in FIG. 5, the first torque arm 33 includes a bifurcated second end having two spaced apart branch plates 44, 44. A connected portion between the first pin 34, the first torque arm 33 and the second torque arm 35 is constructed by connecting the first pin 34, the bifurcated branch plates 44, 44 of first torque arm 33 provided between the first pin 34, the first end of the second torque arm 35, and the nut 91 together, to substantially form a ball-and-socket connection. Washers 81, 82 are provided between the bifurcated branch plates 44, 44 and a first spherical bearing 65, composed of a spherical bushing 84, a fitted collar 85 and a snap ring 86. The spherical bearing 65 is provided inside the bifurcated branch plates 44, 44 in the axial direction. The first end 45 of the second torque arm 35 surrounds and is secured to the first spherical bearing 65.

On the other hand, a connected portion between the fixing bolt 36 and the top bridge 37 is constructed by connecting together the fixing bolt 36 and the second end 46 of the second torque arm 35, via a second spherical bearing 66 composed of a spherical bushing 87, a fitted collar 88 surrounding the bushing, and a snap ring 89. The second end of the second torque arm 35 substantially surrounds and encloses the second spherical bearing 66, forming a second ball-and-socket connection.

Thereby, the steering damper apparatus 30 is capable of absorbing any inclination of longitudinal axes of the connected portions between the top bridge 37 and each torque arm, even if the center 38 of the pivot shaft 32 and the center 48 of the steering shaft incline slightly relative to one another, because the spherical bearings 65, 66 provide dual ball-and-socket joints which adjust to accommodate such inclination.

As described above, the connected portion between the first torque arm 33 and the second torque arm 35, and the connected portion between the second torque arm 35 and the top bridge 37 are each provided with the spherical bearings 65, 66 respectively, whereby a change in angle relative to the inclination of a rotary plane is absorbed by the spherical bearings 65, 66. A pitch error (the distance between a center of the damper pivot shaft of the steering damper apparatus 30 and a center of the vehicle body head pipe) is absorbed by the first torque arm 33 and the second torque arm 35, and therefore, members constituting the steering system bearing 40 are capable of securing smooth movement.

Therefore, even if the pivot shaft 32, which is sliding, the first pin 34 and the connected parts are not formed using enhanced dimensional precision techniques, it is still possible to provide a steering damper apparatus 30 capable of accommodating a change in distance between the pivot shaft 32 and the fixing bolt 36 of the second torque arm 35. In addition, the above-described structure of the steering damper apparatus and the second torque arm automatically adjusts to a change in vertical distance between the pivot shaft 32 and the fixed shaft 42 even if the pivot shaft, which is sliding, and connected parts are not formed having enhanced precision.

FIGS. 6(a) and 6(b) are top working views showing the operation of the steering damper apparatus 30 according to an embodiment of the present invention.

FIG. 6(a) shows a resting state in which the rotary damper 51 is not operating, and the rotary damper 51 is constructed such that a movable partition wall 52 is mounted to an input shaft 56 within the steering damper housing 31; there is provided an oil chamber 53 filled with oil 71; the interior of this oil chamber 53 is partitioned into a first chamber 54 and a second chamber 55 and the first chamber 54 is caused to communicate to the second chamber 55 through a communication passage 57; and this communication passage 57 is provided with an orifice formation member 58.

The orifice formation member 58 is a member in which there is provided a restriction orifice 59 for reducing a flow volume of oil which passes through the interior thereof.

FIG. 6(b) shows a state in which the rotary damper 51 is operating, and for example, when an external force is exerted on the front wheel from the road surface; a force for steering the front wheel to the left is transmitted to the first torque arm 33 via the front fork, the top bridge and the second torque arm (See FIG. 1, 2); and the first torque arm 33 swings as indicated by an arrow a, the movable partition wall 52 swings integrally with the first torque arm 33, and the oil 71 within the second chamber 55 of the rotary damper 51 passes through the communication passage 57 and the orifice formation member 58 to reach the first chamber 54 as indicated by arrows b, c and d in the drawing.

At this time, in the rotary damper 51, since the flow rate of the oil 71 is reduced by the orifice 59 to be installed midway in the course of the communication passage 57, resistance to flow of the oil occurs, so that there works a force which tends to swing the movable partition wall 52 from the second chamber 55 side toward the first chamber 54 side conversely. Thus, in order for the input shaft 56 to rotate in the direction indicated by the arrow a, a great rotating force is required. Accordingly, the steering damper apparatus 30 according to an embodiment of the present invention works to restrain the great rotating force of the input shaft 56 due to the external force.

Figure 7A:
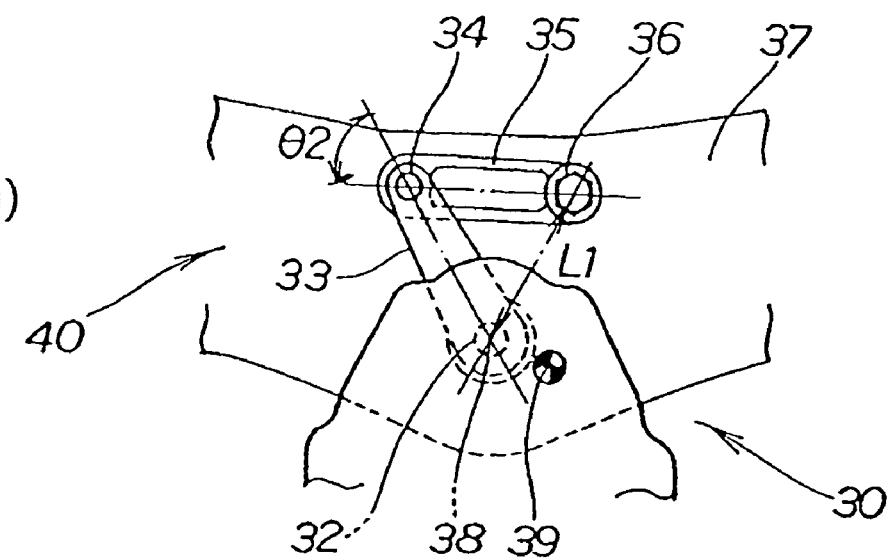
FIGS. 7(a), (b) and (c) are a series of working views showing operation of the linkage of the steering damper apparatus according to an embodiment of the present invention, illustrating the effects of different inputs on the system.
Figure 7B:
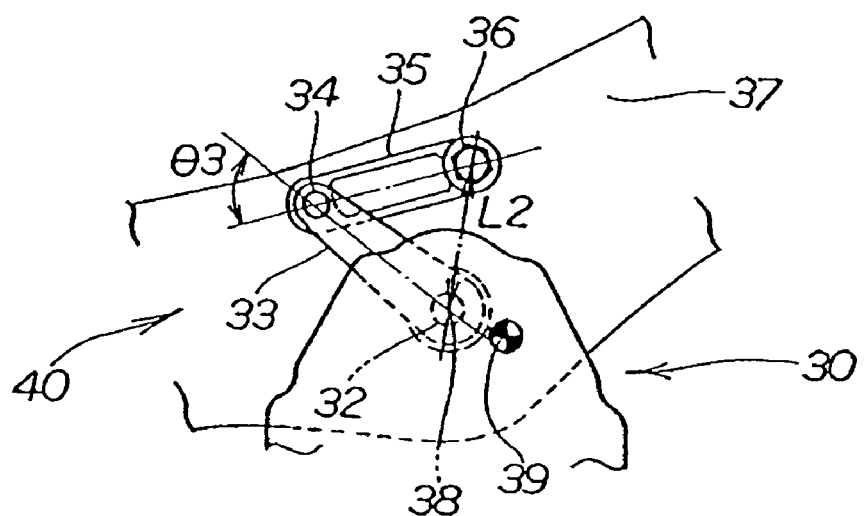
Figure 7C:
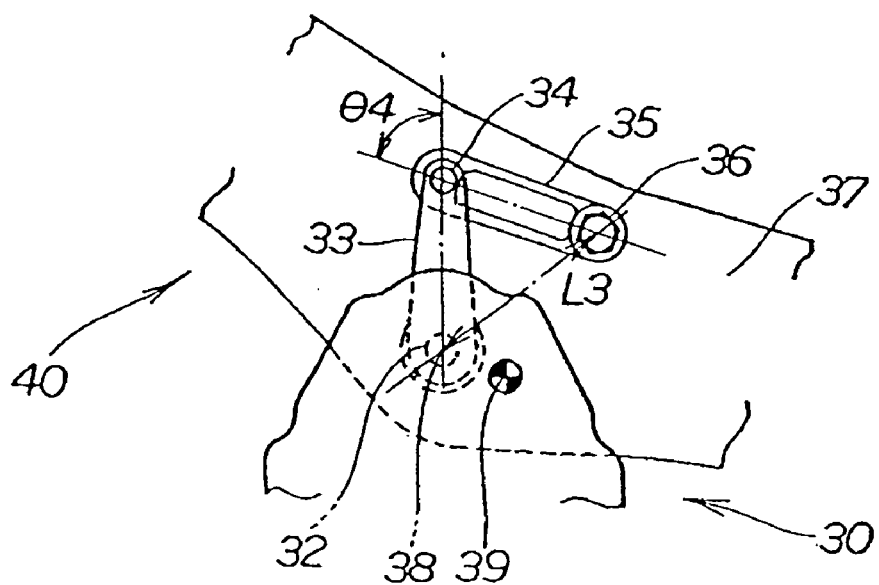

FIGS. 7(a) to 7(c) are working views showing an operation of the steering damper apparatus 30.

FIG. 7(a) shows a state before the steering damper apparatus 30 operates, and at this time, the front wheel (See FIG. 1) is in a state for facing the front of the vehicle. A resting distance between a center 38 of the pivot shaft 32 and a center of the fixing bolt 36 is assumed to be L1, and an angle between a center line of the first torque arm 33 and a center line of the second torque arm 35 is assumed to be θ2.

Also, reference numeral 39 designates a center of the vehicle body head pipe, and distance between this center 39 of the vehicle body head pipe and the center 38 of the pivot shaft 32 is a pitch error.

FIG. 7(b) shows that when the handlebars 14 (See FIG. 1) are steered to the left and the steering damper apparatus 30 operates, and an external force is exerted on the front wheel from the road surface. In this case, a force for steering the front wheel to the left is transmitted to the first torque arm 33 via the front fork (See FIG. 1), the top bridge 37, and the second torque arm 35. The pivot shaft 32 rotates to the left, and the first pin 34 rotates to the left. Since, however, the fixing bolt 36 is made integral with the top bridge 37, the connected portion of the second torque arm 35 with the fixing bolt 36 does not move. However, the inclination of the top bridge 37 has been made larger than the actual one for the sake of simplicity of the description.

As a result, distance L2 between the center 38 of the pivot shaft 32 and the center of the fixing bolt 36 becomes shorter than L1 of FIG. 7(a), and an angle θ3 between the center line of the first torque arm 33 and the center line of the second torque arm 35 becomes smaller than θ2 of FIG. 7(a).

This results from the fact that although the center 38 of the pivot shaft 32 and the center 39 of the vehicle body head pipe deviate by the operation of the steering damper apparatus 30, the steering damper apparatus 30 has absorbed the external force to be exerted from the front wheel (see FIG. 1) of the vehicle by the operation of the spherical bearing 65 (see FIG. 5) interposed in the connected portion between the first pin 34, the first torque arm 33 and the second torque arm 35, and a spherical bearing 66 (see FIG. 5) interposed in the connected portion between the second torque arm 35, the fixing bolt 36 and the top bridge 37.

An external force is exerted on the front wheel from the road surface during traveling of the vehicle. As a result, a force for steering the front wheel to the left is transmitted to the first torque arm 33 via the front fork (See FIG. 1), the top bridge 37 and the second torque arm 35. Even if the pivot shaft 32 rotates to the left although somewhat, and even if the dimensional precision of the pivot shaft 32, which is sliding, the first pin 34 and the connected parts are not be enhanced, the inventive steering damper apparatus 30 is capable of accommodating a change in distance between the center 38 of the pivot shaft 32 and the center of the fixing bolt 36 of the second torque arm 35.

FIG. 7(c) shows that when the handlebars 14 (See FIG. 1) are steered to the right and the steering damper apparatus 30 operates, and an external force is exerted on the front wheel from the road surface. In this case, a force for steering the front wheel to the right is transmitted to the first torque arm 33 via the front fork (See FIG. 1), the top bridge 37, and the second torque arm 35. The pivot shaft 32 rotates to the right although somewhat, and the first pin 34 rotates to the right. Since, however, the fixing bolt 36 is made integral with the top bridge 37, the connected portion of the second torque arm 35 with the fixing bolt 36 does not move. However, the inclination of the top bridge 37 has been made larger than the actual one for the sake of simplicity of the description.

As a result, distance L3 between the center 38 of the pivot shaft 32 and the center of the fixing bolt 36 becomes longer than L1 of FIG. 7(a), and an angle θ4 between the center line of the first torque arm 33 and the center line of the second torque arm 35 becomes larger than θ2 of FIG. 7(a).

An external force is exerted on the front wheel from the road surface during traveling of the vehicle. As a result, a force for steering the front wheel to the right is transmitted to the first torque arm 33 via the front fork (See FIG. 1), the top bridge 37 and the second torque arm 35. Even if the pivot shaft 32 rotates to the right although somewhat, and even if the dimensional precision of the pivot shaft 32, which is sliding, the first pin 34 and the connected parts are not be enhanced, it is possible to provide steering damper apparatus 30 that is capable of accommodating a change in distance between the center 38 of the pivot shaft 32 and the center of the fixing bolt 36 of the second torque arm 35.

From the foregoing, it can be seen that the distance between the pivot shaft 32 and the fixing bolt 36 of the second torque arm 35 is of variable length, within a limited range, because of the first torque arm 33 and the second torque arm 35. Therefore, even if a pitch error occurs with the rotation, in order to absorb it, it is possible to cope with it by a relative change in angle between those two parts: the first torque arm 33 and the second torque arm 35. Therefore, the steering system 40 including the steering damper apparatus 30 becomes capable of securing smooth movement without causing any deformation in the component parts.

Figure 12:
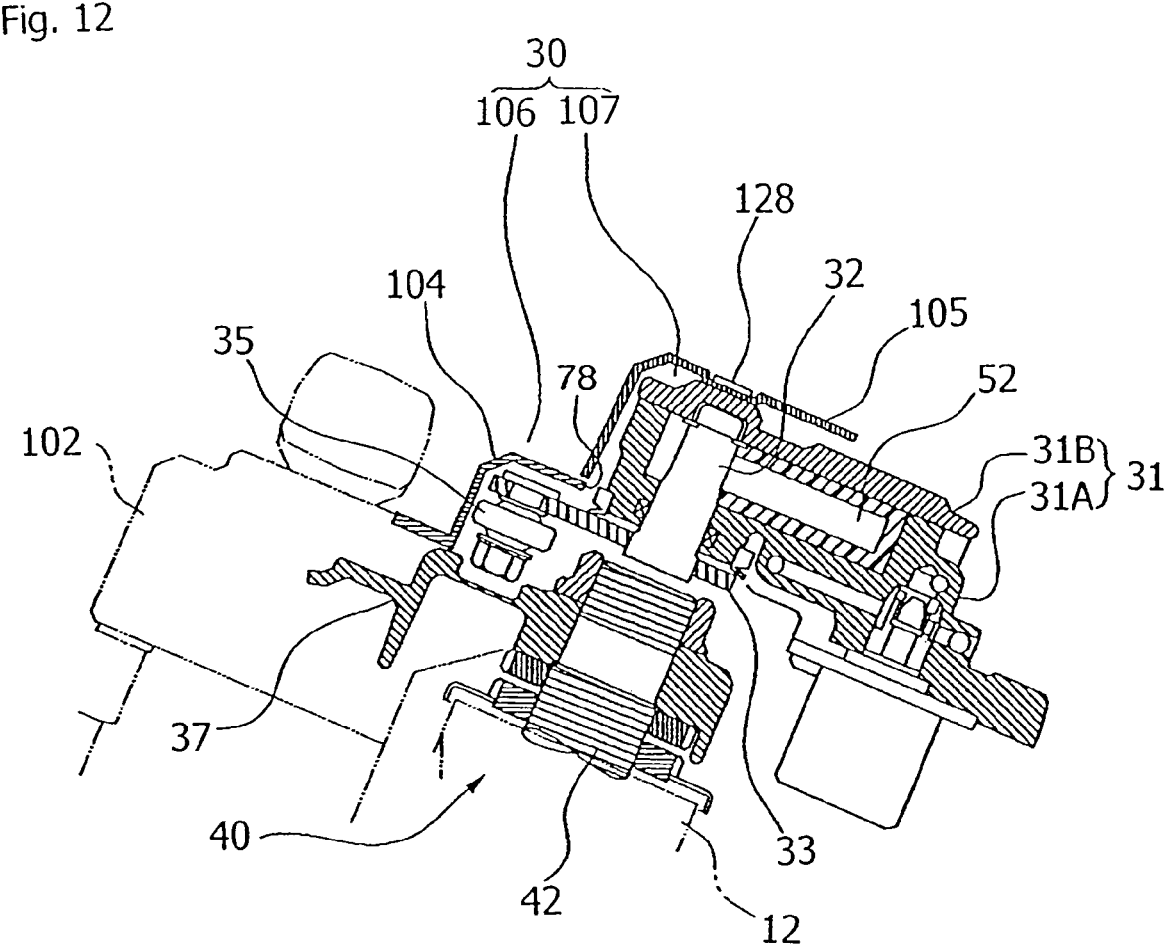
FIG. 12 is a side view of the steering damper of FIG. 11 according to the first embodiment, partially in cross-section, and showing an installed state of the cover of the steering damper apparatus.

As shown also in FIG. 12, a steering damper apparatus 30 is composed of a steering damper body 107 and a cover 106 for covering the steering damper body 107, and is installed to the vehicle body such that it is located lower than a line L4 for connecting between the lower portion of a meter 80 at the rear end to be arranged forward of the head pipe 12 and the upper portion of the key cylinder 102 at the front end (See FIG. 1).

The steering damper body 107 absorbs vibrations at a low steering angle area due to road surface disturbance during traveling at high speed by means of a hydraulic shock absorbing mechanism provided therein. Normally, there are two types: rod type and rotary type. However, the invention described herein uses the rotary type steering damper body because it is excellent in terms of compactness.

Figure 10:
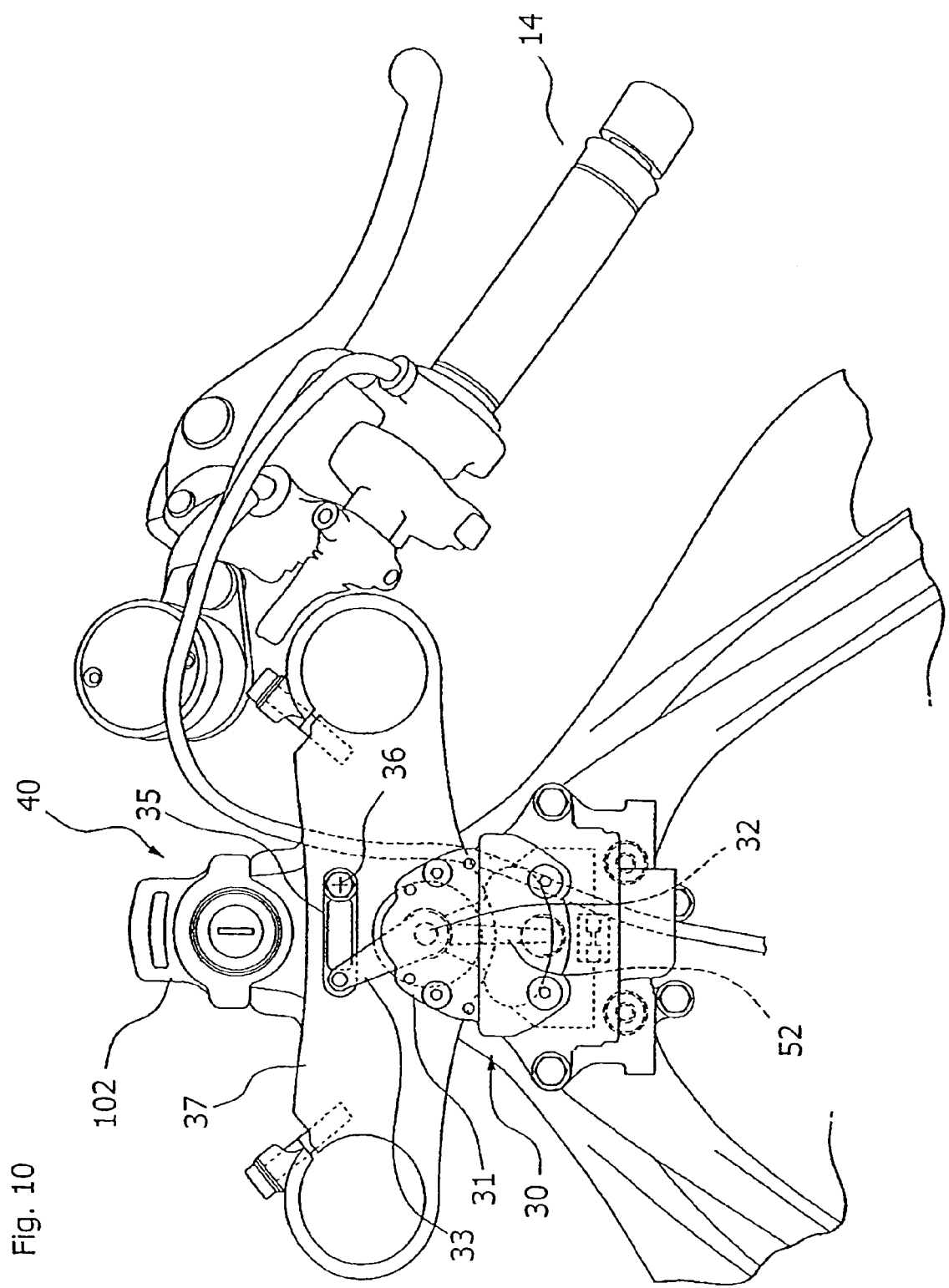
FIG. 10 is a top plan view of a front end portion of a motorcycle, showing an installed state of the steering damper body according to the first embodiment hereof.

The steering damper body 107 has, as shown in FIG. 10 and FIG. 12, a housing 31 consisting of a body 31A and a lid 31B; a movable partition wall 52 for partitioning an oil chamber into two parts within the housing 31; a shaft 56 for rockingly supporting the movable partition wall 52 with respect to the housing 31 while coupling the base of the movable partition wall 52 in a fixed state; and a first torque arm 33 to be connected to a projecting portion which projects downwardly from the housing 31 of the shaft 56.

The housing 31 is installed to a gusset portion of the head pipe 12, which is a member on the body frame side via the steering damper stay 49, and the first torque arm 33 is installed to the top bridge 37, which is a member on the steering system side, by a fixing bolt 36 via the second torque arm 35.

Thus, in this steering damper body 107, when the handlebars 14 are steered to the left or right, the top bridge 37 rotates integrally with the handlebars 14, and the movement is transmitted to the shaft 32 via the second torque arm 35 and the first torque arm 33 to rotate the shaft 32 and the movable partition wall 52 in a predetermined direction. With the rotation, capacity of the two oil chambers 54, 55 within the housing 31 changes respectively. At this time, hydraulic fluid moves within the oil passage 57 for communicating between both oil chambers, 54, 55 and passage resistance of this hydraulic fluid is exerted on the handlebars 14 as a resistance force during rotation. As a result, runout and vibrations of the handlebars 14 are to be absorbed.

Figure 11:
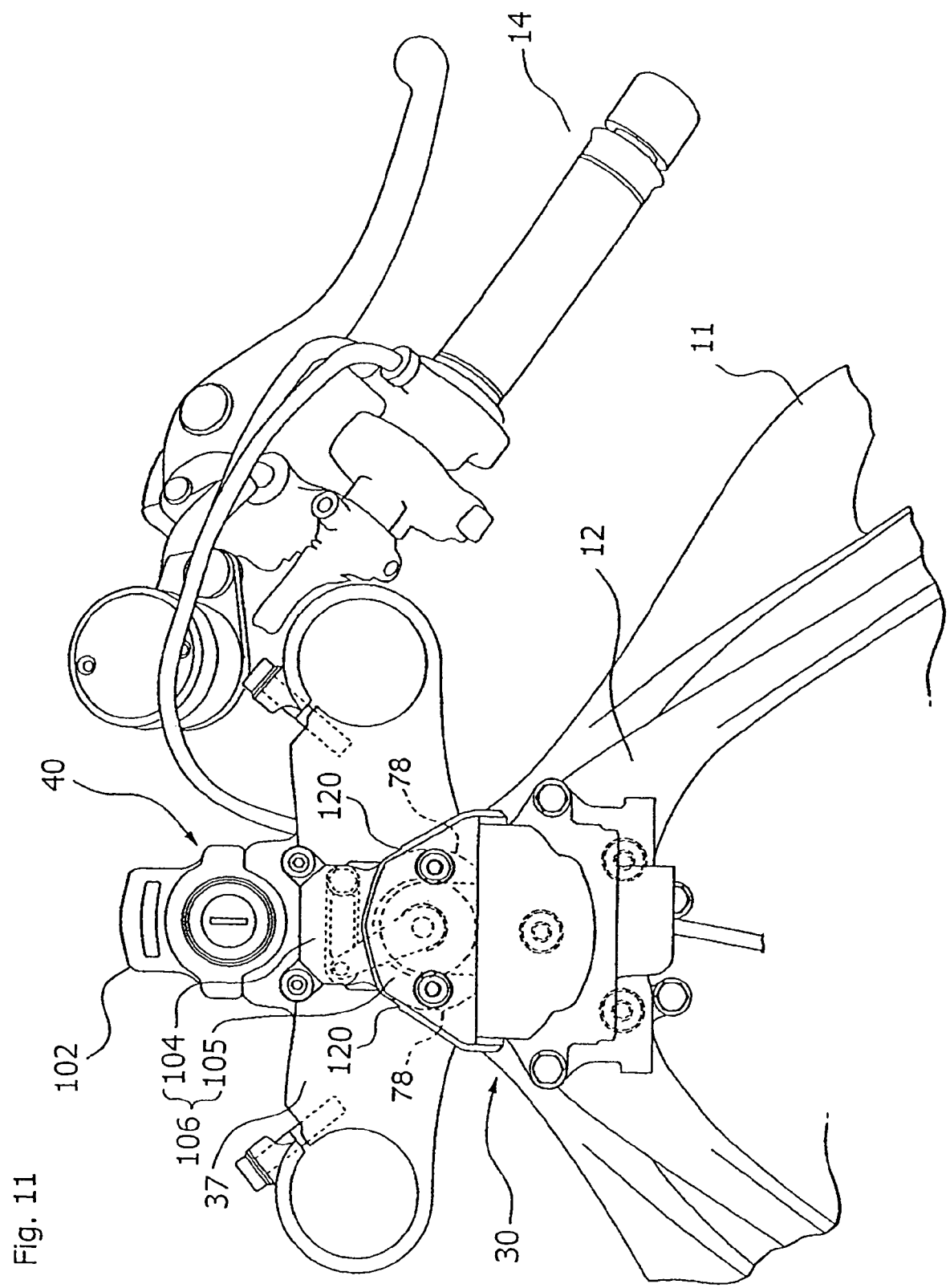
FIG. 11 is a top plan view similar to FIG. 10, showing an installed state of a cover fitting over the steering damper apparatus of FIG. 10.

The steering damper cover 106 is, as shown in FIG. 11 and FIG. 12, composed of: a housing cover 105 for covering substantially a half of the front side of the housing 31; and a torque arm cover 104 for covering the first torque arm 33. The housing cover 105 is fixed to the housing 31, which is a member (fixed side member) on the body frame side, and the torque arm cover 104 is fixed to the top bridge 37, which is a member (movable side member) on the steering system side.

Figure 13:
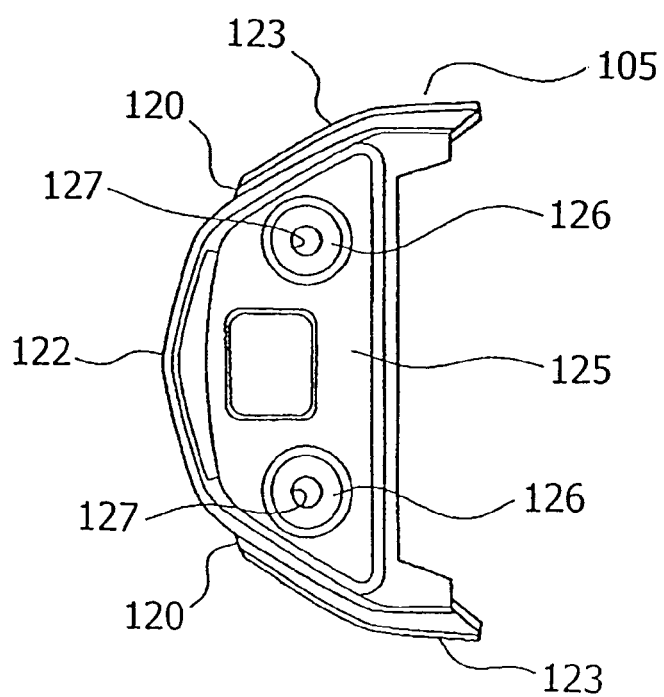
FIG. 13 is a top plan view showing the housing cover for the steering damper apparatus.
Figure 14:
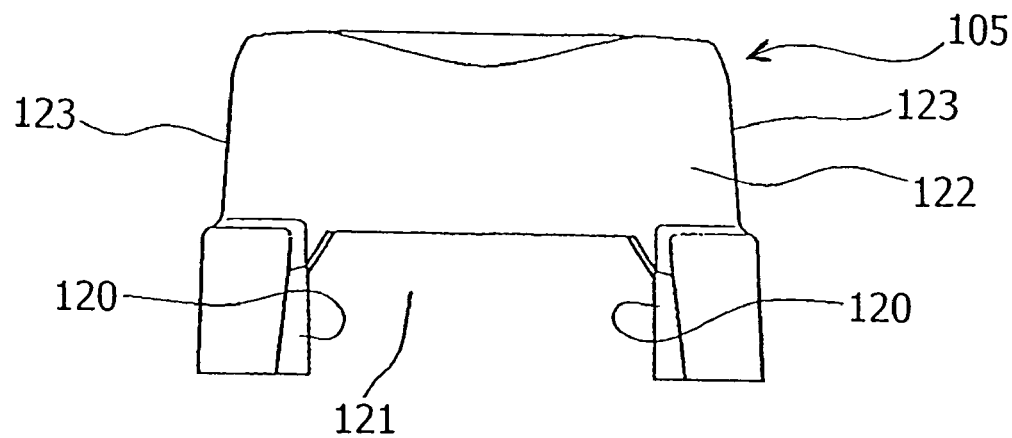
FIG. 14 is a front plan view showing the housing cover of FIG. 13.
Figure 15:
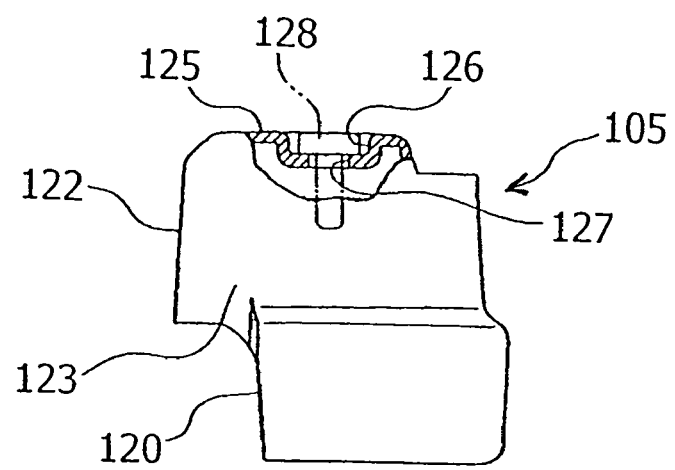
FIG. 15 is a side plan view, partially in cross-section, showing the housing cover of FIGS. 13-14.

The housing cover 105 has, as shown in FIGS. 13 to 15, a front plate portion 122 for covering the front portion of the housing 31 and having an aperture 121 at the center of the lower portion; a pair of left and right side plate portions 123, 123 for covering both sides of left and right of the front portion of the housing 31 respectively; and a upper plate portion 125 for covering the upper portion of the front portion of the housing 31, and is formed by, for example, integral forming through the use of resin material. At two left and right places of the upper plate portion 125, there is formed a concave portion 126, and this concave portion 126 is formed with a bolt insertion hole 127. Thus, this housing cover 105 is fixed to the housing 31 by the tip of the bolt 128 to be inserted into the bolt insertion hole 127 being screwed into the upper surface of the housing 31. In this respect, when the housing cover 105 is fixed to the housing 31 by the bolt 128, the head portion of the bolt 128 is housed within the concave portion 126, and therefore, an apex of the head portion becomes substantially flush with the upper surface without projecting from the upper surface of the housing cover 105.

Figure 16:
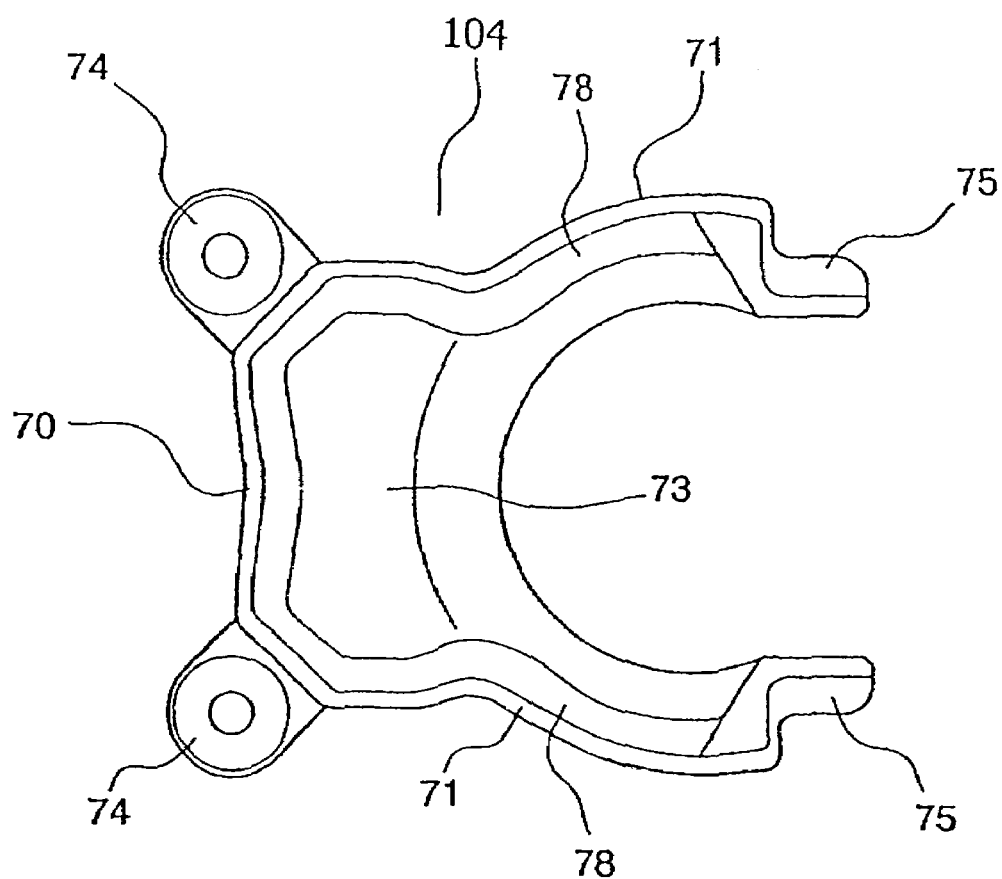
FIG. 16 is a top plan view showing an arm cover for the steering damper apparatus.
Figure 17:
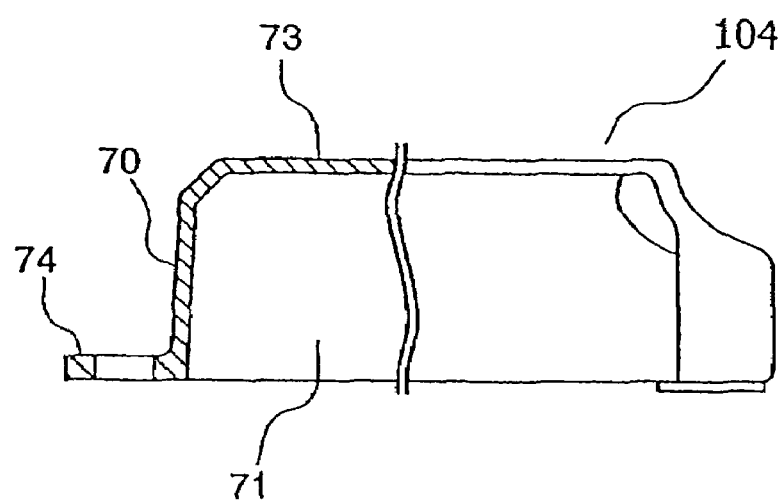
FIG. 17 is a side view, partially in cross-section, showing the arm cover of FIG. 16.
Figure 18A:
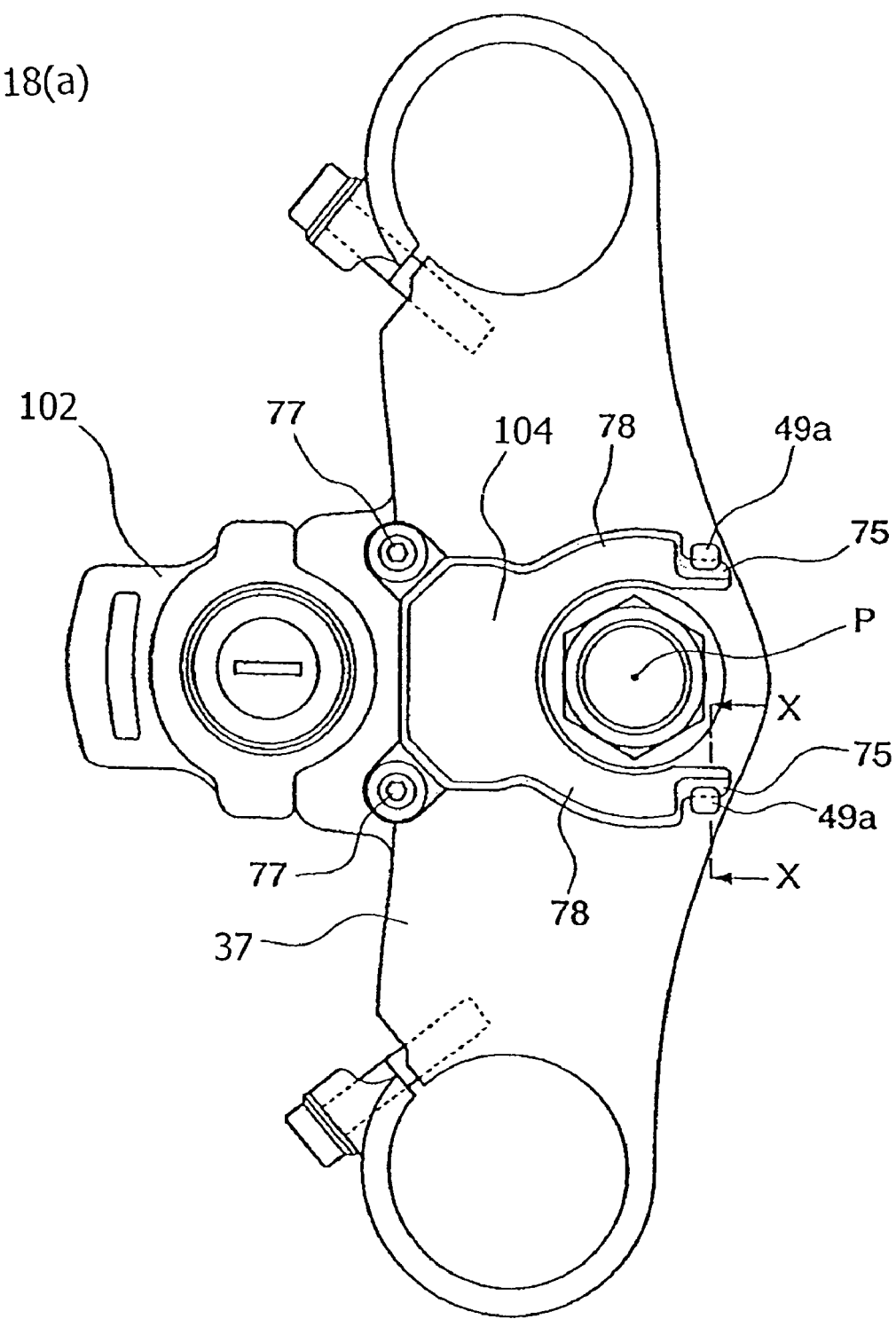
FIG. 18a is a top plan view of a pivotally movable portion of a motorcycle, for explaining an installed state of the arm cover of the steering damper appparatus.
Figure 18B:
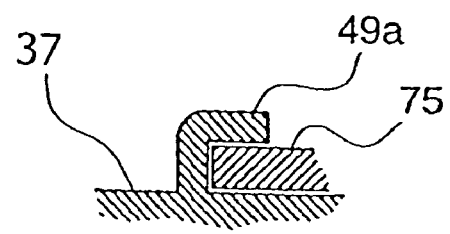

The arm cover 104 has, as shown in FIG. 16 and FIG. 17, a front plate portion 70 for covering the front portion of the first torque arm 33 and the second torque arm 35; a pair of left and right side plate portions 71, 71 for covering the side of lower projecting portions of the first torque arm 33, the second torque arm 35 and the shaft 32; and a upper plate portion 73 for covering the upper portions of the first torque arm 33 and the second torque arm 35, and is manufactured by integral forming through the use of, for example, resin material. At the lower end portion of the front plate portion 70, bolt engaging portions 74 having an insertion hole are provided to project toward the front on the left and right sides, and in the rear portion at the lower ends of the left and right side plate portions 71, 71, tongue-shaped portions 75, 75 are formed to project backward. Portions where the tongue-shaped portions 75, 75 are provided are portions which are covered with the housing cover 105 when the torque arm cover 104 is fixed to a regular position with respect to the top bridge 37. Thus, the torque arm cover 104 is fixed to the top bridge 37 when the left and right tongue-shaped portions 75, 75 are restrained by a U-character-shaped restraining portion 49a which stands on the top bridge 37, a bolt 77 is inserted into the insertion hole in the bolt engaging portion 74, and its tip is screwed into the top bridge 37 (See FIG. 18).

On the mating surface with the housing cover 105 at the rear end portion of the side plate portion 71 of the torque arm cover 104, there is formed a circular arc surface 78. This circular arc surface 78 is formed so as to have the same center P as the pivot axis of the member of the steering system 40 such as, for example, the top bridge 37 and the handlebars 14 (See FIG. 18) when the arm cover 104 is fixed at a regular position of the top bridge 37. Also, the rear end portions of the upper plate portion 73 and the side plate portions 71, 71 of the arm cover 104 are to be inserted inwardly from the aperture 121 of the front plate portion of the housing cover 105 so as to be housed within the housing cover 105 by plane sight as shown also in FIG. 11 when the arm cover 104 is fixed at the regular position of the top bridge 37.

Next, the description will be made of an operation of the steering damper apparatus 30 installed on a motorcycle 10 having the above-described structure.

According to the steering damper apparatus 30 having the above-described structure, substantially a half of the front side of the housing 31, particularly the front portion of a mating portion between the body 31a and the lid 31B of the housing 31 is covered with the housing cover 105, and a projecting portion of the shaft 32 for projecting downward from the housing 31, the first torque arm 33 connected to the shaft 32, and the second torque arm 35 for coupling therewith are covered with the torque arm cover 104. Therefore, it is possible to prevent dust and rainwater, which receive wind pressure while the vehicle is traveling, from directly striking against the substantially half of the front side of the housing 31 and the first torque arm 33.

Also, the housing 31 and the first torque arm 33, which are members for constituting the steering damper body 107, are not exposed to the outside, and the outside appearance is attractive.

Also, since the cover 106 for covering the steering damper body 107 is divided into the housing cover 105 to be installed to a member on the body frame side, which is a fixed side, and the torque arm cover 104, which is a portion to be installed to a member on the steering system side, a movable side, the steering damper 107 having a movable element can be covered with a comparatively small cover.

Also, when the steering system-side member such as, for example, the handlebars 14 and the top bridge 37, rocks, the torque arm cover 104 also rocks following it. However, since at the rear end portion of the torque arm cover 104, there is formed a circular arc surface 78 having the same center P as the pivot axis of the steering system-side member, a clearance between both covers 53A and 53B can be set to be small in advance. In other words, the clearance between the circular arc surface 78 of the side plate portion 71 of the torque arm cover 104 and a wall surface 120 of the front plate portion of the housing cover 105 which stands face to face with the circular arc surface 78 can be set to be small.

In this respect, the above-described embodiment is strictly an illustration of the present invention, and it is possible to appropriately change the design without departing from the gist of the invention as the occasion arises.

For example, in the above-described embodiment, since the housing 31 is installed to the member on the body frame side, which is a fixed side, and the first torque arm 33 is installed to the member on the steering system side, which is a movable side, the housing cover 105 has been installed to the body frame-side member and the torque arm cover 104 has been installed to the steering system-side member. Conversely, when the housing 31 is installed to the steering system-side member and the first torque arm 33 is installed to the body frame-side member, the housing cover 105 is to be installed to the steering system-side member and the torque arm cover 104 is to be installed to the body frame-side member accordingly.

Also, although in the above-described embodiment, the housing cover 105 has been installed to the housing 31, the housing cover 105 may be installed to the head pipe 12 or the steering damper stay 59. Also, the torque arm cover 104 may be also directly installed to the first torque arm 33 in place of the top bridge 37.

Also, although in the above-described embodiment, at the rear end of the torque arm cover 104, there has been provided the circular arc surface 78, on the mating portion of the housing cover 105 with the torque arm cover 104, there may be formed a circular arc surface having the same center as the pivot axis of the steering system conversely.

Second Embodiment

Figure 8:
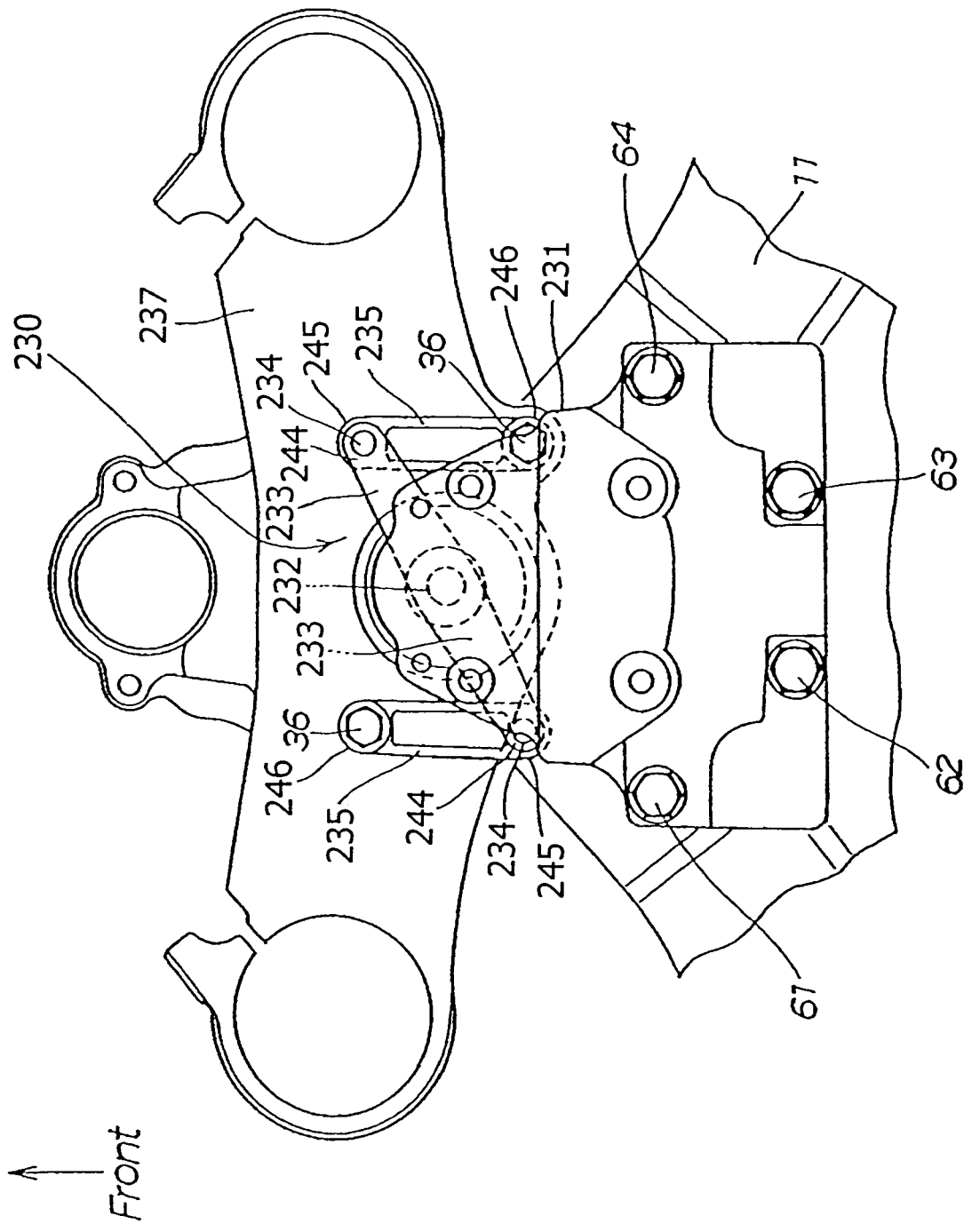
FIG. 8 is a top plan view showing a front central portion of the motorcycle of FIG. 1, illustrating a steering damper apparatus according to a second embodiment of the invention.
Figure 9:
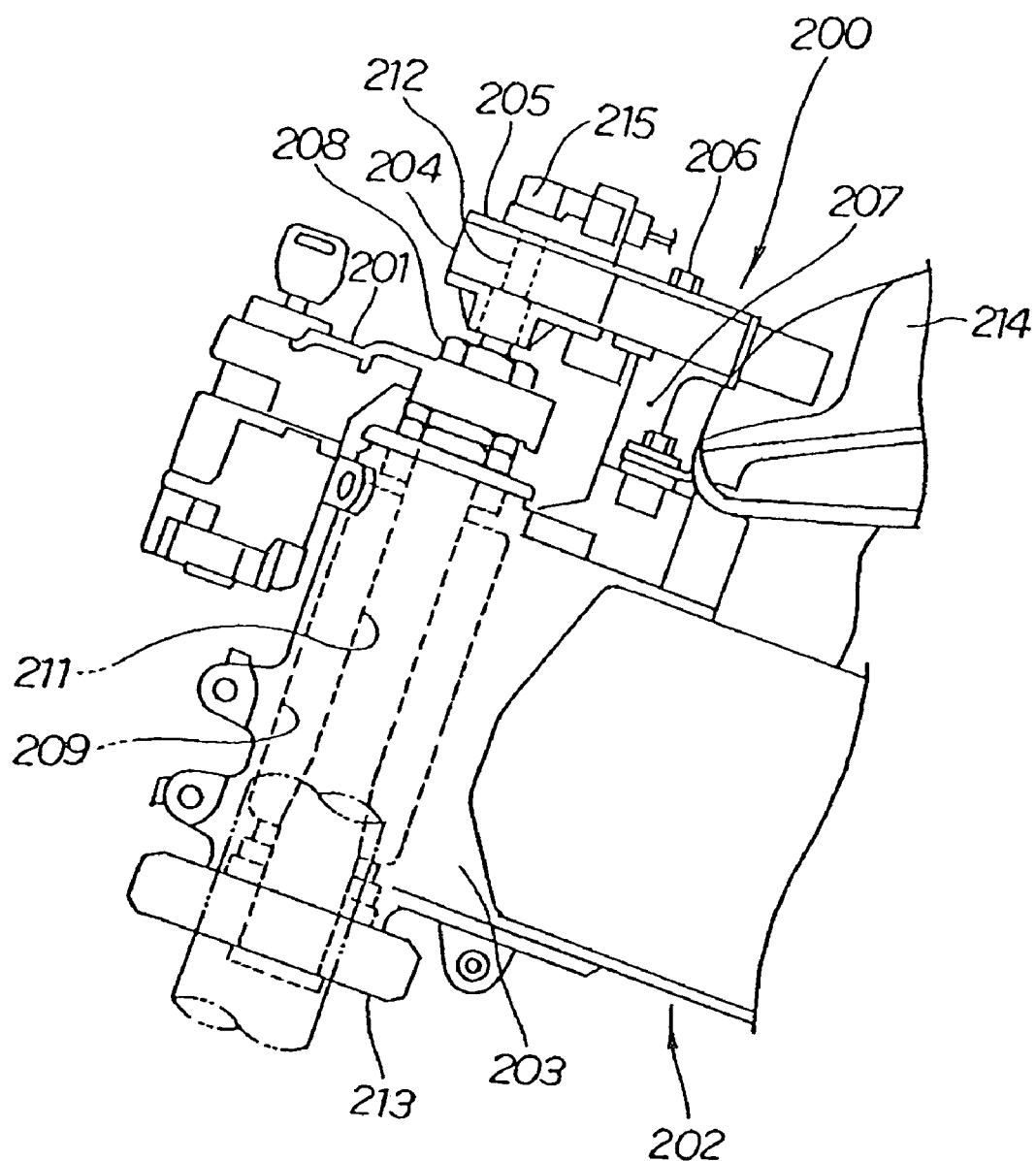
FIG. 9 is a reproduction of FIG. 2 of Japanese Patent Laid-Open No. 2003-81172, showing a prior art steering damper in side plan view.

FIG. 8 is a top plan view showing a top central portion of the front of a motorcycle including a steering damper apparatus 230 according to a second embodiment of the invention. In this second embodiment, the steering damper apparatus 230 includes a linkage structure having a single first torque arm 233 with two ends extending outwardly, and dual second torque arms 235, arranged to form a Z-shape. The steering damper apparatus 230 of the second embodiment is constructed such that the lower end portion of the steering damper housing 231 is fixed to the main frame 11 with bolts 61, 62, 63, 64. to the first torque arm 233, the central portion of which is fixed to the pivot shaft 232 and each of the other ends 244, 244 of these two first torque arms 233, one ends 245, 245 of two second torque arms 235, 235 are connected via the first pins 234, 234; and tips 246, 246 of these two second torque arms 235, 235 on the opposite side are fixed to the top bridge 237 via fixing bolts 36, 36.

In a resting state, in which the steering damper apparatus 230 does not operate, an installed state of the first torque arm 233 and the second torque arms 235, 235 with the pivot shaft 232 as the center is of Z-shaped link structure. In a state in which the steering damper apparatus 230 operates, the first torque arm 233 and the second torque arms 235, 235 are pivotally movable via the pivot shaft 232 and the first pins 234, 234.

When the installed state of the first torque arm 233 and the second torque arms 235, 235 with the pivot shaft 232 as the center is made into the Z-shaped link structure as described above, a couple for generating rotary motion is caused as compared with cantilever structure, and therefore, it is possible to negate the moment and to reduce friction and abrasion in the sliding points.

Optionally, this second embodiment of the steering damper apparatus 230 may also incorporate the dual ball-and-socket connection structure of the second torque arm 35 shown in FIG. 5 for each of the second torque arms 235, 235, as well as the bifurcated end structure at each end of the first torque arm 233, as illustrated in FIG. 5.

In this respect, the steering damper apparatus 30, 230 according to an embodiment of the present invention has been shown and discussed herein as being disposed above the head pipe and the handlebars, but as regards its installed position, no detailed constrictions are imposed. Also, the steering damper apparatus 30, 230 may be controlled electronically.

The foregoing description is intended to illustrate, rather than to limit the invention. Although a number of selected illustrative embodiments of the present invention are explained in detail above, those skilled in the art will realize that the present invention may be modified in a variety of ways. All such modifications, which fall within the scope of the appended claims, are intended to be within the spirit and scope of the present invention.

We claim:

1. A steering damper apparatus adapted to be installed on a vehicle between a vehicle body side and a pivotally movable steering system member that allows steering of the vehicle, said steering damper apparatus comprising:
a damper housing having an oil chamber formed therein;
a rotary damper comprising a pivotally movable damper shaft and a partition wall attached to the damper shaft, the partition wall disposed within the oil chamber of the damper housing;
a first torque arm having a first end fixed to the pivotally movable shaft of said rotary damper and a second end opposite said first end, and
a second torque arm having a first end which is pivotally attached to the second end of said first torque arm, and a second end opposite said first end of said second torque arm;
wherein the second end of said second torque arm is operatively attached to one of the vehicle body side and the steering system member, and the damper housing of said steering damper apparatus is operatively attached to the other of the vehicle body side and the steering system member.

2. The steering damper apparatus of claim 1, wherein the apparatus includes a ball and socket connection at each end of the second torque arm.

3. The steering damper apparatus of claim 1, wherein said first and second torque arms are connected by a connecting pin extending therebetween, and wherein said pivotally movable steering system member comprises a top bridge with a concave recess formed in an upper surface thereof to accommodate a lower end of said connecting pin.

4. A vehicle incorporating the steering damper apparatus of claim 1.

5. A steering damper apparatus, comprising:
a housing having an oil chamber formed therein;
a pivotally movable partition wall disposed in said oil chamber of said housing for partitioning said oil chamber into two parts;
a pivot shaft affixed to said partition wall for movably supporting said movable partition wall with respect to said housing while coupling a base of said movable partition wall in a fixed state;
wherein said steering damper apparatus is operable to dampen movement of said movable partition wall in said housing by circulating hydraulic fluid between said two oil chamber parts, and characterized in that
one end of said pivot shaft extends outwardly from said housing and has an arm coupled to the outwardly extended portion thereof;

said housing is installed to one of a body frame-side member and a steering system-side member;
a housing cover for covering said housing is installed to one of said body frame-side member and said steering system-side member or to said housing;
said arm is installed to the other of said body frame-side member and said steering system-side member; and
an arm cover for covering said arm is installed to the other of said body frame-side member and said steering system-side member, or said arm.

6. The steering damper apparatus according to claim 5, characterized in that on at least one of a mating surface between said housing cover and said arm cover, there is formed a circular arc surface having the same center as a pivot axis of said steering system-side member.

7. The steering damper apparatus according to claim 5, characterized in that said arm cover is fixed to said steering system-side member by a fastener located adjacent an installation area of said steering system-side member of said arm, and is restrained on said steering system-side member by a restraint at a portion to be covered by said housing cover.

8. The steering damper apparatus of claim 5, wherein the apparatus includes a ball and socket connection at each end of the second torque arm.

9. A vehicle incorporating the steering damper apparatus of claim 5.

10. A steering damper apparatus for a two-wheeled vehicle, the vehicle comprising a vehicle frame and a steering portion, wherein the steering portion is pivotally movable relative to the vehicle frame,
the steering damper apparatus comprising a linkage for absorbing relative motion between the vehicle frame and the steering portion, the linkage comprising a first portion that is fixed to the vehicle frame, the linkage comprising a second portion which is fixed to the steering portion,
wherein the linkage is secured to the first portion using a first connector, and the linkage is secured to the second portion using a second connector, wherein both the first connector and the second connector allow the linkage to be pivotally movable relative to the respective vehicle frame and steering portion,
wherein the steering damper apparatus comprises a rotary damper having a rotary damper housing,
the linkage comprises
a first torque arm having one end fixed to a pivotally movable shaft of said rotary damper, and
a second torque arm having a first end coupled to the other end of said first torque arm in such a manner as to be pivotally movable,
and wherein a second end of said second torque arm is secured to the steering portion in such a manner as to be pivotally movable, and
the housing of said rotary damper is fixed to the vehicle frame.

11. The steering damper apparatus of claim 10 wherein both the first connector and the second connector comprise a spherical bearing.

12. The steering damper apparatus of claim 10 wherein the first end of the second torque arm is secured to the other end of the first torque arm using a pin member, and wherein the steering portion comprises a top bridge,
the linkage is disposed to be overlying at least a portion of the top bridge,
the upper surface of the top bridge comprises a depression formed thereon and a portion of the pin member is received within the depression.

13. The steering damper apparatus of claim 10 wherein the rotary damper comprises a movable partition wall, the movable partition wall providing a barrier for partitioning an oil chamber into two parts within the rotary damper housing, wherein a damping force is generated against the movable partition wall by circulating hydraulic fluid between said two oil chambers;
wherein the rotary damper comprises the pivotally movable shaft for rotatably supporting said movable partition wall with respect to the housing while coupling a base of said movable partition wall in a fixed state, characterized in that one portion of said pivotally movable shaft is caused to project outwardly from the housing, and one end of the first torque arm is fixed to the pivotally movable shaft of said rotary damper via said one portion of said pivotally movable shaft.

14. The steering damper apparatus of claim 13 wherein the steering damper apparatus comprises covering, the covering comprising a housing cover and a torque arm cover, wherein
the housing cover for covering the housing is secured to the vehicle frame; and
the torque arm cover for covering said first torque arm is secured to the steering portion.

15. The steering damper apparatus of claim 14, wherein that on at least one of a mating surface between the housing cover and the torque arm cover, there is formed a circular arc surface having the same center as a center of rotation of the steering portion.

16. The steering damper apparatus of claim 15, wherein the torque arm cover is fixed to the steering portion by a fastener located adjacent a bolt which secures the second end of the second torque arm to the top bridge, and the torque arm cover is also restrained on the top bridge by a restraint, positioned so as to be covered by the housing cover.

17. The steering damper apparatus of claim 10, wherein the apparatus includes a ball and socket connection at each end of the second torque arm.

18. A vehicle incorporating the steering damper apparatus of claim 10.

* * * * *